United States Patent
Harrington et al.

(10) Patent No.: US 12,442,322 B1
(45) Date of Patent: Oct. 14, 2025

(54) VEHICLE POWER SYSTEMS AND METHODS

(71) Applicant: Cummins Emission Solutions Inc., Columbus, IN (US)

(72) Inventors: Alex Dylan Harrington, Nineveh, IN (US); Cami Brigette Ethington, Nashville, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/777,270

(22) Filed: Jul. 18, 2024

(51) Int. Cl.
  *F01N 3/20* (2006.01)
  *F01N 11/00* (2006.01)

(52) U.S. Cl.
  CPC .......... *F01N 3/2013* (2013.01); *F01N 11/002* (2013.01); *F01N 2240/16* (2013.01); *F01N 2560/06* (2013.01); *F01N 2900/08* (2013.01); *F01N 2900/104* (2013.01); *F01N 2900/1404* (2013.01); *F01N 2900/1602* (2013.01)

(58) Field of Classification Search
  CPC .. F01N 3/2013; F01N 11/002; F01N 2240/16; F01N 2560/06; F01N 2900/08; F01N 2900/104; F01N 2900/1404; F01N 2900/1602
  USPC .................. 60/274, 284, 286, 300, 303, 320
  See application file for complete search history.

(56) References Cited

U.S. PATENT DOCUMENTS

| | | | | |
|---|---|---|---|---|
| 2009/0211233 | A1* | 8/2009 | Watanabe | F01N 3/2013 60/277 |
| 2009/0277705 | A1* | 11/2009 | Ichikawa | B60L 50/16 180/65.21 |
| 2015/0224878 | A1* | 8/2015 | Hashimoto | B60L 1/08 307/10.1 |
| 2015/0354425 | A1 | 12/2015 | Hudgens et al. | |
| 2017/0082043 | A1* | 3/2017 | Dudar | F01N 3/101 |
| 2018/0094556 | A1* | 4/2018 | Kurtz | F01N 3/027 |
| 2018/0266349 | A1* | 9/2018 | Almkvist | F01N 13/009 |

(Continued)

FOREIGN PATENT DOCUMENTS

| | | |
|---|---|---|
| CN | 110520342 A | 11/2019 |
| DE | 10 2009 044 742 | 6/2010 |

(Continued)

*Primary Examiner* — Jorge L Leon, Jr.
(74) *Attorney, Agent, or Firm* — Foley & Lardner LLP

(57) ABSTRACT

A controller for a vehicle power system that includes (i) a vehicle that has a battery, an alternator powered by an engine, and an exhaust aftertreatment system that includes an exhaust aftertreatment component, a temperature sensor, and a heater, and (ii) an external power source that is separate from the vehicle. The controller receives, from the temperature sensor, a first temperature signal associated with temperature of the exhaust aftertreatment component and, in response to determining that the temperature is less than a target temperature of the exhaust aftertreatment component, causes power to be provided from the external power source to the heater. The controller further receives, from the temperature sensor, a second temperature signal associated with the target temperature and provides an indicator indicative of the exhaust aftertreatment component reaching the target temperature and the external power source being disconnectable from at least one of the controller or the heater.

19 Claims, 6 Drawing Sheets

(56) References Cited

U.S. PATENT DOCUMENTS

2020/0182118 A1\*  6/2020  Yokoi ................... F01N 3/2006
2023/0032897 A1\*  2/2023  Sensi ................... F01N 3/0253

FOREIGN PATENT DOCUMENTS

DE    10 2012 205 534 A1    10/2012
JP          2011-032969 A     2/2011

\* cited by examiner

US 12,442,322 B1

VEHICLE POWER SYSTEMS AND METHODS

TECHNICAL FIELD

The present application relates generally to vehicle power systems and methods for exhaust aftertreatment systems of internal combustion engines.

BACKGROUND

The exhaust of internal combustion engines, such as diesel engines, includes nitrogen oxide ($NO_X$) compounds. To reduce $NO_X$ emissions, a treatment fluid may be dosed into the exhaust by a doser assembly within an aftertreatment system. The treatment fluid facilitates conversion of a portion of the exhaust into non-$NO_X$ emissions, such as nitrogen ($N_2$), carbon dioxide ($CO_2$), and water ($H_2O$), thereby reducing $NO_X$ emissions. Such an aftertreatment system may include a heater than increases a temperature of the exhaust.

SUMMARY

In one embodiment, a controller for a vehicle power system that includes (i) a vehicle that has a battery, an alternator powered by an engine, and an exhaust aftertreatment system that includes an exhaust aftertreatment component, a temperature sensor, and a heater, and (ii) an external power source that is separate from the vehicle. The controller receives, from the temperature sensor, a first temperature signal associated with a temperature of the exhaust aftertreatment component and, in response to determining that the temperature is less than a target temperature of the exhaust aftertreatment component, causes power to be provided from the external power source to the heater. The controller further receives, from the temperature sensor, a second temperature signal associated with the target temperature and provides an indicator indicative of the exhaust aftertreatment component reaching the target temperature and the external power source being disconnectable from at least one of the controller or the heater.

In some embodiments, the controller further, in response to providing the indicator, determines that the external power source is disconnected from the at least one of the controller or the heater and, in response to determining that the external power source is disconnected and an operation of the heater should be maintained, causes the power to be provided from at least one of the battery or the alternator to the heater.

In some embodiments, the controller further, in response to receiving a key-on signal associated with a key-on event of the vehicle, causes the power to be provided from the alternator to the heater in addition to providing the power from the external power source to the heater.

In some embodiments, after receiving the key-on signal, during a first time period, an amount of the power provided from the external power source to the heater is greater than an amount of the power provided from the alternator to the heater. During a second time period after the first time period, the amount of the power provided from the alternator to the heater is greater than the amount of the power provided from the external power source to the heater.

In some embodiments, during a third time period after the first time period and before the second time period, the amount of the power provided from the external power source to the heater is equal to 95% to 105% of the amount of the power provided from the alternator to the heater.

In some embodiments, the controller further, in response to receiving the key-on signal, causes the power to be provided from the battery to the heater in addition to providing the power from the alternator and the external power source to the heater.

In some embodiments, the controller further, prior to receiving the key-on signal, causes the power to be provided from the battery to the heater in addition to providing the power from the external power source to the heater.

In some embodiments, the controller receives the key-on signal in response to the engine being powered on.

In some embodiments, the controller further, in response to receiving the key-on signal, delays providing the power from the alternator to the heater for a predetermined time period equal to or greater than 5 seconds.

In some embodiments, the predetermined time period is between 5 seconds and 30 seconds, inclusive.

In some embodiments, an exhaust aftertreatment system includes the controller, the heater, and a second heater. The heater is disposed at a first location within the exhaust aftertreatment system. The second heater is disposed at a second location within the exhaust aftertreatment system different from the first location. The controller further causes the power to be provided from at least one of the alternator, the battery, or the external power source to the second heater.

In some embodiments, the exhaust aftertreatment system includes the exhaust aftertreatment component, a second exhaust aftertreatment component, the temperature sensor, and a second temperature sensor. The exhaust aftertreatment component is disposed proximate to the first location of the heater. The controller further receives, from the second temperature sensor, a third temperature signal associated with a second temperature of the second exhaust aftertreatment component, and, in response to providing the power from the at least one of the alternator, the battery, or the external power source to the second heater, receives, from the second temperature sensor, a fourth temperature signal associated with a second target temperature of the second exhaust aftertreatment component. The second target temperature is greater than the second temperature. The indicator is further indicative of the second exhaust aftertreatment component reaching the second target temperature.

In some embodiments, the controller further determines, based on at least one of the temperature or the target temperature, a speed of a fan of the vehicle and causes a fan power associated with the speed to be provided from at least one of the alternator, the battery, or the external power source to the fan while providing the power from the external power source to the heater.

In some embodiments, the controller further determines the speed based on the temperature and the target temperature.

In some embodiments, the controller further determines a state of charge of the battery, and, in response to determining that the state of charge is less than a target threshold, causes battery power to be provided from at least one of the alternator or the external power source to the battery.

In another embodiment, a vehicle power system of a vehicle includes an engine and an exhaust aftertreatment system disposed downstream of the engine. The exhaust aftertreatment system receives and treats exhaust provided by the engine. The exhaust aftertreatment system includes an exhaust aftertreatment component, a temperature sensor, and a heater. The vehicle power system further includes a fan disposed upstream of the exhaust aftertreatment component and a controller. The controller receives, from the temperature sensor, a first temperature signal associated with a temperature of the exhaust aftertreatment component and, in response to determining that the temperature is less than a target temperature of the exhaust aftertreatment component, causes power to be provided from an external power source to the heater, the external power source separate from the vehicle. The controller further, while the engine is powered off, transmits a control signal to the fan to blow air towards the exhaust aftertreatment component. A flow path of the air crosses the heater and the exhaust aftertreatment component.

In some embodiments, the fan is disposed downstream of the engine, and a distance between the fan and the engine is at least 0.5 meters.

In some embodiments, the fan is disposed upstream of the engine.

In some embodiments, the engine includes a cylinder, an intake valve associated with the cylinder, and an exhaust valve associated with the cylinder. The controller further causes the intake valve and the exhaust valve to be set to an open position while the fan is blowing the air.

In yet another embodiment, a method for controlling a vehicle power system that includes (i) a vehicle that has an engine and an exhaust aftertreatment system that includes an exhaust aftertreatment component, a temperature sensor, and a heater, and (ii) an external power source that is separate from the vehicle. The method includes providing, by a controller, power from the external power source to the heater and, while the engine is powered off, transmitting a control signal to a fan to blow air towards the exhaust aftertreatment component. A flow path of the air crosses the heater and the exhaust aftertreatment component. The method further includes receiving, by the controller from the temperature sensor, a temperature signal associated with a target temperature of the exhaust aftertreatment component and providing, by the controller, an indicator indicative of the exhaust aftertreatment component reaching the target temperature and the external power source being disconnectable.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
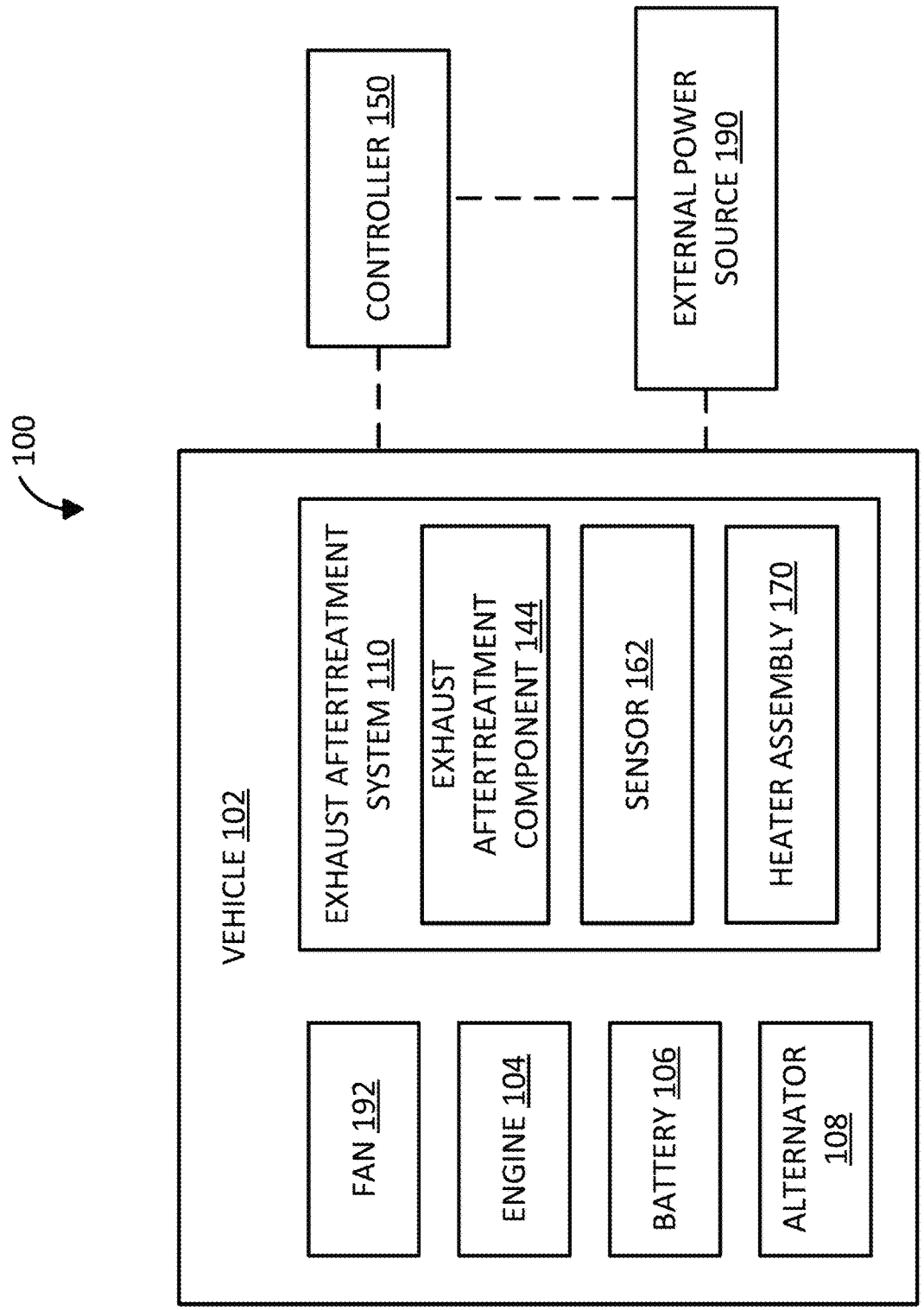
FIG. 1 is a block schematic diagram of an example vehicle power system including an exhaust aftertreatment system that includes a heater assembly.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and systems for a vehicle power system. The various concepts introduced above and discussed in greater detail below may be implemented in any of a number of ways, as the described concepts are not limited to any particular manner of implementation. Examples of specific implementations and applications are provided primarily for illustrative purposes.

I. OVERVIEW

Internal combustion engines (e.g., diesel internal combustion engines, etc.) produce exhaust that may be treated by a doser assembly within an exhaust aftertreatment system. The doser assembly treats the exhaust using a treatment fluid (e.g., reductant, hydrocarbon fluid, etc.) released from the doser assembly by an injector of a doser. Different treatment fluids can be utilized to achieve different benefits. For example, a treatment fluid, such as reductant, may be adsorbed by a catalyst member and the adsorbed treatment fluid in the catalyst member may function to reduce $NO_X$ in the exhaust. In another example, a treatment fluid, such as hydrocarbon fluid, may increase a temperature of the exhaust to reduce $NO_X$ in the exhaust. The doser assembly is mounted on a component of the exhaust aftertreatment system. For example, the doser assembly may be mounted to a decomposition reactor, an exhaust conduit, a panel, or other similar components of the exhaust aftertreatment system.

In some situations, the treatment fluid may form deposits within an exhaust aftertreatment system. For example, the treatment fluid may form deposits by crystalizing on surfaces of an exhaust conduit downstream of the doser assembly. A heater may be disposed downstream of the doser assembly and upstream of the catalyst member and may be utilized to increase temperatures of the exhaust, a fluid mixture of the exhaust and the treatment fluid, and/or the catalyst member. This increase in temperature may mitigate formation of the deposits and/or increase $NO_X$ conversion efficiency of the catalyst member. At early stages of the vehicle's startup (e.g., at cold start, etc.), a temperature of the catalyst member may be relatively low. The $NO_X$ conversion efficiency of the catalyst member may be relatively low when the temperature of the catalyst member is relatively low.

Implementations described herein relate to a vehicle power system that is configured to cause power to be provided from an external power source that is separate from a vehicle to a heater of the vehicle that heats an exhaust aftertreatment component (e.g., the catalyst member, etc.) of the vehicle. After providing power to the heater, the vehicle power system may be configured to receive a temperature signal associated with a target temperature of the exhaust aftertreatment component and provide an indicator indicative of the exhaust aftertreatment component reaching the target temperature and the external power source being disconnectable. Due to the heating provided by the heater that is powered by the external power source, the exhaust aftertreatment component may reach the target temperature before the vehicle (e.g., the engine, etc.) is powered on (i.e., prior to the cold start, etc.), resulting in a greater $NO_X$ conversion efficiency for the catalyst member (i.e., relative to not heating the catalyst member prior to powering on the vehicle). By enabling the exhaust aftertreatment component to reach the target temperature, the formation of deposits may be mitigated before it would be in systems without heating provided by the heater, thereby enabling systems described herein to provide relatively higher fuel economy.

II. OVERVIEW OF EXAMPLE VEHICLE POWER SYSTEM

FIG. 1 depicts a vehicle power system 100. The vehicle power system 100 includes a vehicle 102 (e.g., a car, a truck, etc.). The vehicle 102 includes an engine 104 (e.g., an internal combustion engine, etc.). The engine 104 is configured to (e.g., structured to, able to, etc.) receive a fluid mixture of fuel (e.g., diesel, gasoline, hydrogen, etc.) and air, combust the fluid mixture, and provide an exhaust based on combustion of the fluid mixture.

The vehicle 102 includes a battery 106 (e.g., an on-vehicle battery, an energy storage device, etc.). The battery 106 is configured to provide electrical power to one or more components of the vehicle 102. For example, the battery 106 may provide electrical power to lights, an air conditioning unit, motors, displays, or the like, of the vehicle 102. Additionally, the battery 106 may be utilized for powering the vehicle 102 (e.g., for powering electric driving motors where the vehicle 102 is a hybrid vehicle, etc.). In embodiments in which the engine 104 is a spark-ignition engine, the battery 106 may be electrically or communicatively coupled to the engine 104 and provide electrical power to spark plugs of the engine 104.

The vehicle 102 includes an alternator 108 (e.g., a generator, etc.). The alternator 108 is configured to convert mechanical power produced by the engine 104 into electrical power. The alternator 108 may be electrically or communicatively coupled to the battery 106 and configured to provide the electrical power to the battery 106 (i.e., to charge the battery 106, etc.). For example, when the vehicle 102 is moving, rotational provided by the engine 104 may be provided to movement members (e.g., wheels, etc.) and the alternator via a serpentine belt drive system.

Figure 2:
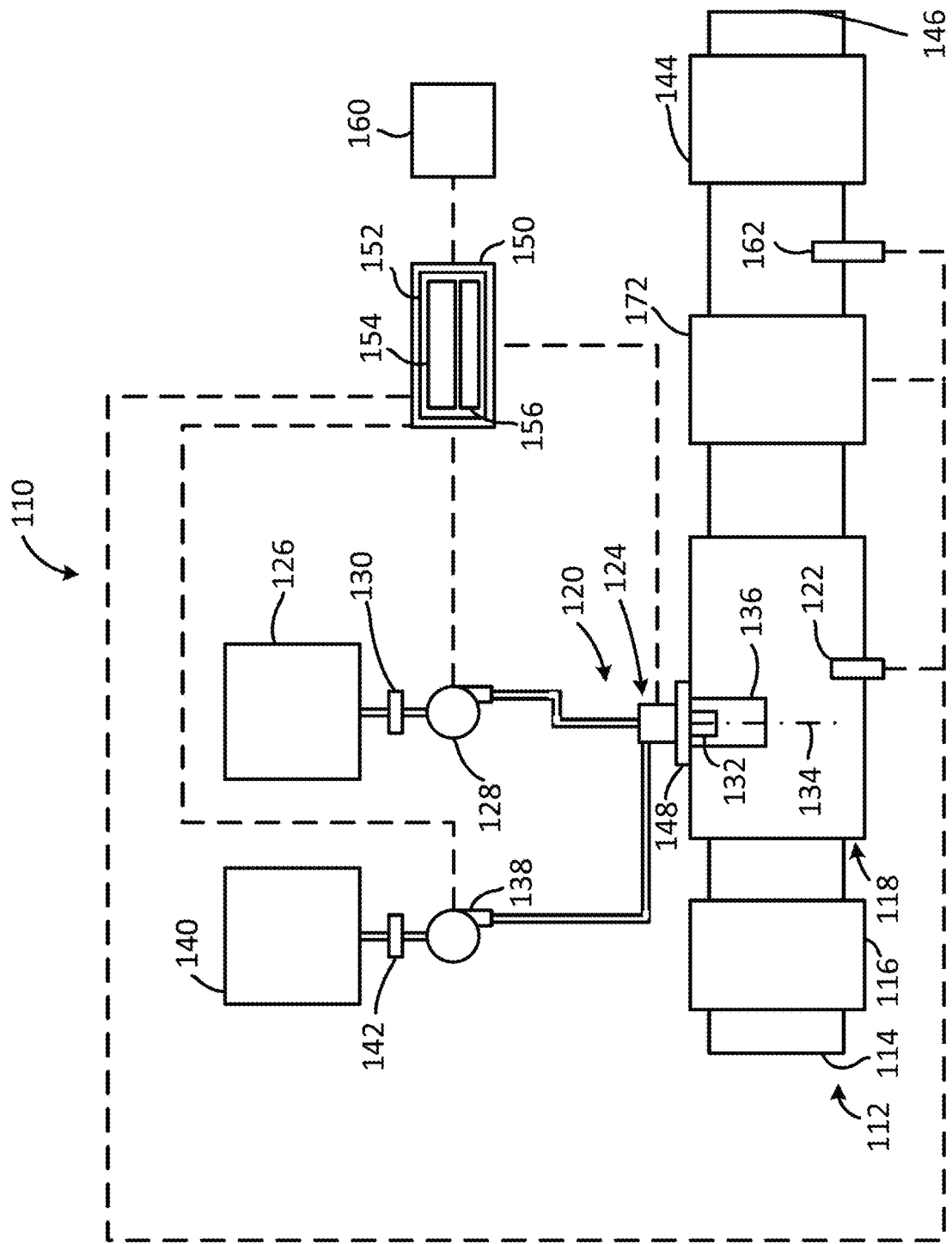
FIG. 2 is a block schematic diagram of the exhaust aftertreatment system of FIG. 1.

The vehicle 102 further includes an exhaust aftertreatment system 110. The exhaust aftertreatment system 110 is disposed downstream of the engine 104. The exhaust aftertreatment system 110 is configured to treat the exhaust released by the engine 104. As illustrated in FIG. 2, the exhaust aftertreatment system 110 includes an exhaust conduit system 112. The exhaust conduit system 112 is configured to receive the exhaust from the engine 104 via an inlet 114. The exhaust aftertreatment system 110 further includes a particulate filter 116 (e.g., a diesel particulate filter (DPF), etc.). The particulate filter 116 is coupled to the exhaust conduit system 112 and configured to remove particulate matter, such as soot, from the exhaust flowing in the exhaust conduit system 112. The particulate filter 116 includes an inlet, where the exhaust is received, and an outlet, where the exhaust exits after having particulate matter substantially filtered from the exhaust and/or converting the particulate matter into $CO_2$. In some embodiments, the particulate filter 116 is omitted from the exhaust aftertreatment system 110.

The exhaust aftertreatment system 110 further includes a decomposition chamber 118 (e.g., reactor, reactor pipe, conduit, housing, etc.) disposed downstream of the particulate filter 116. The decomposition chamber 118 is configured to receive the exhaust from the particulate filter 116. The exhaust aftertreatment system 110 further includes a treatment fluid delivery system 120 coupled to the decomposition chamber 118. The treatment fluid delivery system 120 is configured to deliver treatment fluid to the decomposition chamber 118. The treatment fluid may be, for example, a reductant (e.g., a urea, a diesel exhaust fluid (DEF), Adblue®, a urea water solution (UWS), an aqueous urea solution (e.g., AUS32, etc.), and/or other similar fluids) or a hydrocarbon fluid (e.g., a fuel, an oil, an additive, etc.). When the reductant is introduced into the exhaust, reduction of emission of undesirable components (e.g., $NO_X$, etc.) in the exhaust may be facilitated. When the hydrocarbon fluid is introduced into the exhaust, the temperature of the exhaust may be increased (e.g., to facilitate regeneration of components of the exhaust aftertreatment system 110, etc.). For example, the exhaust aftertreatment system 110 may include an igniter 122 (e.g., spark plug, etc.) configured to increase the temperature of the exhaust by combusting the hydrocarbon fluid within the exhaust. The decomposition chamber 118 includes an inlet in fluid communication with the particulate filter 116 to receive the exhaust containing $NO_X$ emissions and an outlet for the exhaust, $NO_X$ emissions, ammonia, and/or the treatment fluid to flow to downstream components of the exhaust aftertreatment system 110.

The treatment fluid delivery system 120 includes a doser assembly 124 (e.g., a dosing module, etc.) configured to dose the treatment fluid into the decomposition chamber 118 (e.g., via an injector). The doser assembly 124 is mounted to the decomposition chamber 118 such that the doser assembly 124 may dose the treatment fluid into the exhaust flowing through the exhaust conduit system 112.

The doser assembly 124 is fluidly coupled to (e.g., fluidly configured to communicate with, etc.) a treatment fluid source 126. The treatment fluid source 126 may include multiple treatment fluid sources 126. The treatment fluid source 126 may be, for example, a diesel exhaust fluid tank containing Adblue®. A treatment fluid pump 128 (e.g., a supply unit, etc.) is used to pressurize the treatment fluid from the treatment fluid source 126 for delivery to the doser assembly 124. In some embodiments, the treatment fluid pump 128 is pressure-controlled (e.g., controlled to obtain a target pressure, etc.). The treatment fluid pump 128 may include a treatment fluid filter 130. The treatment fluid filter 130 filters (e.g., strains, etc.) the treatment fluid prior to the treatment fluid being provided to internal components (e.g., pistons, vanes, etc.) of the treatment fluid pump 128. For example, the treatment fluid filter 130 may inhibit or prevent the transmission of solids (e.g., solidified treatment fluid, contaminants, etc.) to the internal components of the treatment fluid pump 128. In this way, the treatment fluid filter 130 may facilitate prolonged desirable operation of the treatment fluid pump 128. In some embodiments, the treatment fluid pump 128 is coupled (e.g., fastened, attached, affixed, welded, etc.) to a chassis of the vehicle 102.

The doser assembly 124 includes at least one injector 132. Each injector 132 is configured to dose the treatment fluid into the exhaust (e.g., within the decomposition chamber 118, etc.) at an injection axis 134. The exhaust aftertreatment system 110 may include a mixer 136 (e.g., a mixing body assembly, a swirl generating device, a vane plate, an inlet plate, a deflector plate, etc.). In some embodiments, at least a portion of the mixer 136 may be located within the decomposition chamber 118. In further embodiments, at least a portion of the mixer 136 may also be located in a conduit of the exhaust conduit system 112 (e.g., a conduit upstream of the decomposition chamber 118, etc.). The mixer 136 is configured to receive the exhaust from the decomposition chamber 118 and the treatment fluid from the injector 132. The mixer 136 is also configured to facilitate mixing of the exhaust and the treatment fluid. The mixer 136 is configured to facilitate swirling (e.g., tumbling, rotation, etc.) of the exhaust and/or the treatment fluid and mixing (e.g., combination, etc.) of the exhaust and the treatment fluid so as to disperse the treatment fluid within the exhaust downstream of the mixer 136. By dispersing the treatment fluid within the exhaust (e.g., to obtain an increased uniformity index, etc.) using the mixer 136, reduction of emission of undesirable components in the exhaust is enhanced.

In some embodiments, the injection axis 134 extends into the mixer 136. The injection axis 134 may extend into the mixer 136 at an angle relative to a central axis of the mixer 136. For example, in some embodiments, the injection axis 134 may be substantially coincident with the central axis of the mixer 136. In other embodiments, the injection axis 134 may be substantially perpendicular to the central axis of the mixer 136. In yet other embodiments, the injection axis 134 may be substantially parallel to the central axis of the mixer 136.

In some embodiments, the injector 132 is not directly coupled to the mixer 136. In these embodiments, the injector 132 and the mixer 136 may each be coupled to a same component (e.g., a housing, a panel, a chamber, a body, etc.). In other embodiments, the injector 132 is directly coupled to the mixer 136. In these embodiments, the injector 132 and the mixer 136 may also each be coupled to the same component. In some embodiments, the injector 132 is not disposed within the mixer 136. In other embodiments, the injector 132 may be at least partially disposed within the mixer 136.

The treatment fluid delivery system 120 may include an air pump 138. The air pump 138 draws air from an air source 140 (e.g., an air intake, etc.) through an air filter 142 disposed upstream of the air pump 138 and provides the air to the doser assembly 124 via a conduit. In these embodiments, the doser assembly 124 is configured to mix the air and the treatment fluid into an air-treatment fluid mixture and to provide the air-treatment fluid mixture into the decomposition chamber 118. In other embodiments, the treatment fluid delivery system 120 does not include the air pump 138, the air source 140, and/or the air filter 142. In such embodiments, the doser assembly 124 is not configured to mix the treatment fluid with the air.

The exhaust aftertreatment system 110 further includes an exhaust aftertreatment component 144. In some embodiment, the exhaust aftertreatment component 144 includes a catalyst member (e.g., a Selective Catalytic Reduction (SCR) catalyst member, etc.) disposed downstream of the decomposition chamber 118. As a result, the treatment fluid is injected upstream of the catalyst member such that the catalyst member receives a mixture of the treatment fluid and exhaust. Droplets of the treatment fluid undergo processes of evaporation, thermolysis, and hydrolysis to form non-$NO_X$ emissions (e.g., gaseous ammonia, etc.) within the exhaust conduit system 112. In other embodiments, the exhaust aftertreatment component 144 includes an oxidation catalyst member (e.g., a diesel oxidation catalyst (DOC), an ammonia oxidation catalyst ($AMO_X$), etc.). In yet other embodiments, the exhaust aftertreatment component 144 includes a particulate filter (e.g., the particulate filter 116, etc.).

The exhaust aftertreatment component 144 includes an upstream face in fluid communication with the decomposition chamber 118 from which the exhaust and the treatment fluid are received and a downstream face in fluid communication with an outlet 146 of the exhaust conduit system 112. The outlet 146 may release the treated exhaust into an ambient environment or another treatment system.

The exhaust aftertreatment system 110 may further include an oxidation catalyst member in fluid communication with the exhaust conduit system 112 (e.g., downstream of the exhaust aftertreatment component 144, upstream of the exhaust aftertreatment component 144, upstream of the particulate filter 116, upstream of the decomposition chamber 118, etc.) to oxidize hydrocarbons and carbon monoxide in the exhaust.

In some embodiments, the particulate filter 116 may be positioned downstream of the decomposition chamber 118. For instance, the particulate filter 116 and the exhaust aftertreatment component 144 may be combined into a single unit.

The exhaust aftertreatment system 110 may further include a doser mounting bracket 148 (e.g., a coupler, a plate, etc.). The doser mounting bracket 148 couples the doser assembly 124 to a component of the exhaust aftertreatment system 110 (e.g., the decomposition chamber 118, etc.). The doser mounting bracket 148 may be configured as an insulator (e.g., a vibrational insulator, a thermal insulator, etc.). For example, the doser mounting bracket 148 may be configured to mitigate the transfer of heat from the exhaust passing through the exhaust conduit system 112 and/or the decomposition chamber 118 to the doser assembly 124. In this way, the doser assembly 124 is capable of operating more efficiently. The doser mounting bracket 148 may be configured to mitigate transfer of vibrations from components of the exhaust aftertreatment system 110 (e.g., the exhaust conduit system 112, the decomposition chamber 118, etc.) to the doser assembly 124. The doser mounting bracket 148 may be configured to aid in reliable installation of the doser assembly 124, thereby decreasing manufacturing costs associated with the exhaust aftertreatment system 110 and ensuring repeated desirable installation of the doser assembly 124.

In various embodiments, the doser mounting bracket 148 couples the doser assembly 124 to the decomposition chamber 118. In some embodiments, the doser mounting bracket 148 couples the doser assembly 124 to a conduit of the exhaust conduit system 112. For example, the doser mounting bracket 148 may couple the doser assembly 124 to a conduit of the exhaust conduit system 112 that is upstream of the decomposition chamber 118. In some embodiments, the doser mounting bracket 148 couples the doser assembly 124 to the particulate filter 116 and/or the exhaust aftertreatment component 144. The location of the doser mounting bracket 148 may be varied depending on the application of the exhaust aftertreatment system 110. For example, in some exhaust aftertreatment systems 110, the doser mounting bracket 148 may be located further upstream than in other exhaust aftertreatment systems 110. Furthermore, some exhaust aftertreatment systems 110 may include multiple doser assemblies 124 and therefore may include multiple doser mounting brackets 148.

As illustrated in FIGS. 1 and 2, the vehicle power system 100 further includes a controller 150 (e.g., a vehicle power system controller, a treatment fluid delivery system controller, etc.). The controller 150 is electrically or communicatively coupled to the igniter 122. The controller 150 may control the igniter 122 to ignite the treatment fluid in the decomposition chamber 118. For example, where the controller 150 may cause the igniter 122 to provide an electrical arc in a region traversed by the hydrocarbon fluid, and the electrical arc may ignite the hydrocarbon fluid. The controller 150 is electrically or communicatively coupled to the doser assembly 124. The controller 150 may control the doser assembly 124 to dose the treatment fluid into the decomposition chamber 118. The controller 150 is electrically or communicatively coupled to the treatment fluid pump 128 and/or the air pump 138. The controller 150 may also control operations of the treatment fluid pump 128 and/or the air pump 138. The controller 150 is electrically or communicatively coupled to the engine 104. The controller 150 may also control operations of the engine 104 (e.g., spark plug ignition, fuel injection, etc.). The controller 150 is also electrically or communicatively coupled to the battery 106 and/or the alternator 108. The controller may also control power input and/or power output from and/or to the battery 106 and/or the alternator 108.

The controller 150 includes a processing circuit 152. The processing circuit 152 includes a processor 154 and a memory 156. The processor 154 may include a microprocessor, an application-specific integrated circuit (ASIC), a field-programmable gate array (FPGA), etc., or combinations thereof. The memory 156 may include, but is not limited to, electronic, optical, magnetic, or any other storage or transmission device capable of providing the processor 154 with program instructions. This memory 156 may include a memory chip, Electrically Erasable Programmable Read-Only Memory (EEPROM), Erasable Programmable Read Only Memory (EPROM), flash memory, or any other suitable memory from which the controller 150 can read instructions. The instructions may include code from any suitable programming language. The memory 156 may include various modules that include instructions which are configured to be implemented by the processor 154.

The controller 150 may be configured to communicate with a central controller 160 (e.g., engine control unit (ECU), engine control module (ECM), etc.) of the engine 104. In some embodiments, the central controller 160 and the controller 150 are integrated into a single controller.

In some embodiments, the central controller 160 is communicable with a display device (e.g., a screen, a monitor, a touch screen, a heads up display (HUD), an indicator light, etc.). The display device may be configured to change state in response to receiving information from the central controller 160. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 160. By changing state, the display device may provide an indication to a user (e.g., an operator, a technician, etc.) of a status (e.g., operation, in need of service, etc.) of the treatment fluid delivery system 120 and/or the vehicle power system 100.

The vehicle power system 100 further includes a sensor 162. The sensor 162 may be disposed within the exhaust aftertreatment system 110. The sensor 162 may be disposed upstream, within, around, or downstream of the exhaust aftertreatment component 144. The sensor 162 is electrically or communicatively coupled to the controller 150 and is configured to provide one or more signals associated with the exhaust and/or the fluid mixture of the exhaust and the treatment fluid to the controller 150. The sensor 162 is configured to provide a signal and the controller 150 is configured to receive the signal from the sensor 162 and determine a characteristic of the exhaust and/or the fluid mixture of the exhaust and the treatment fluid based on the signal. The vehicle power system 100 may include multiple of the sensor 162 (e.g., the sensors 162). Each of the sensors 162 may facilitate measurement of the same characteristic or a number of characteristics of the exhaust and/or treatment fluid.

In some embodiments, the sensor 162, or at least one of the sensors 162, is a temperature sensor and the signal is a temperature signal, such that the controller 150 determines the temperature of the exhaust and/or the fluid mixture of the exhaust and the treatment fluid based on the temperature signal. The temperature of the exhaust and/or the fluid mixture of the exhaust and the treatment fluid determined by the controller 150 based on the temperature signal may represent an estimated temperature of the of the exhaust aftertreatment component 144. In other embodiments, the sensor 162 is a non-temperature sensor and the signal is a non-temperature signal associated with the temperature of the exhaust and/or the fluid mixture of the exhaust and the treatment fluid, such that the controller 150 determines the temperature of the exhaust and/or the fluid mixture based on the non-temperature signal. For example, the sensor 162 may be a pressure sensor and/or a velocity sensor and the signal may be a pressure signal and/or a velocity signal, and the controller 150 is configured to determine the temperature of the exhaust and/or the fluid mixture of the exhaust and the treatment fluid based on the pressure signal and/or the velocity signal.

The sensor 162, or at least one of the sensors 162, may be a nitrogen oxide sensor and the signal may be a nitrogen oxide signal, such that the controller 150 determines a concentration of the nitrogen oxide of the exhaust and/or the fluid mixture of the exhaust and the treatment fluid based on the nitrogen oxide signal. The sensor 162, or at least one of the sensors 162, may be a particulate matter sensor and the signal may be a particulate matter signal, such that the controller 150 determines a concentration of the particulate matter of the exhaust and/or the fluid mixture of the exhaust and the treatment fluid based on the particulate matter signal.

The vehicle power system 100 further includes a heater assembly 170. The heater assembly 170 is disposed within the exhaust aftertreatment system 110. The heater assembly 170 is electrically or communicatively coupled to the controller 150. The heater assembly 170 includes one or more heaters (e.g., a grid gas heater, a surface heater, a resistance heater, a ceramic heater, a thermoelectric heater, a combustion heater, an electrical heater, etc.).

As illustrated in FIGS. 2-5, the heater assembly 170 includes an exhaust aftertreatment component heater 172 (e.g., a grid gas heater, a surface heater, a resistance heater, a ceramic heater, a thermoelectric heater, a combustion heater, an electrical heater, etc.). The exhaust aftertreatment component heater 172 may be proximate to the exhaust aftertreatment component 144 (e.g., less than 1, 3, 5, etc. times a diameter of the exhaust aftertreatment component 144 away from the exhaust aftertreatment component 144, less than 1, 3, 5, etc. times a diameter of the exhaust aftertreatment component heater 172 away from the exhaust aftertreatment component 144, less than 1, 3, 5, etc. times a diameter of the exhaust conduit system 112 away from the exhaust aftertreatment component 144, etc.). For example, the exhaust aftertreatment component heater 172 may be disposed upstream, within, around, or downstream of the exhaust aftertreatment component 144. The exhaust aftertreatment component heater 172 is configured to increase temperatures of air, the exhaust, and/or the treatment fluid, which may allow the exhaust aftertreatment component 144 to transition from an ambient temperature to an operating temperature (e.g., a temperature higher than the ambient temperature, etc.) relatively quickly (i.e., at a faster rate than the exhaust aftertreatment component 144 would reach the operating temperature without heating assistance from the exhaust aftertreatment component heater 172). Increasing the temperature of the exhaust facilitates evaporation of the treatment fluid which may improve mixing between the exhaust and the treatment fluid and mitigate deposit accumulation in the exhaust conduit system 112. Increasing the temperature of the exhaust aftertreatment component 144 may increase the $NO_X$ efficiency of the exhaust aftertreatment component 144 and mitigate deposit accumulation in the exhaust conduit system 112.

The exhaust aftertreatment component heater 172 is electrically or communicatively coupled to the controller 150. The controller 150 may be configured to control operations of the exhaust aftertreatment component heater 172, such as causing the exhaust aftertreatment component heater 172 to operate at a target input power (e.g., a heater input power, etc.) and/or a target heater temperature. The exhaust aftertreatment component heater 172 may be configured to generate heat via energy (e.g., electrical current, etc.).

Figure 3:
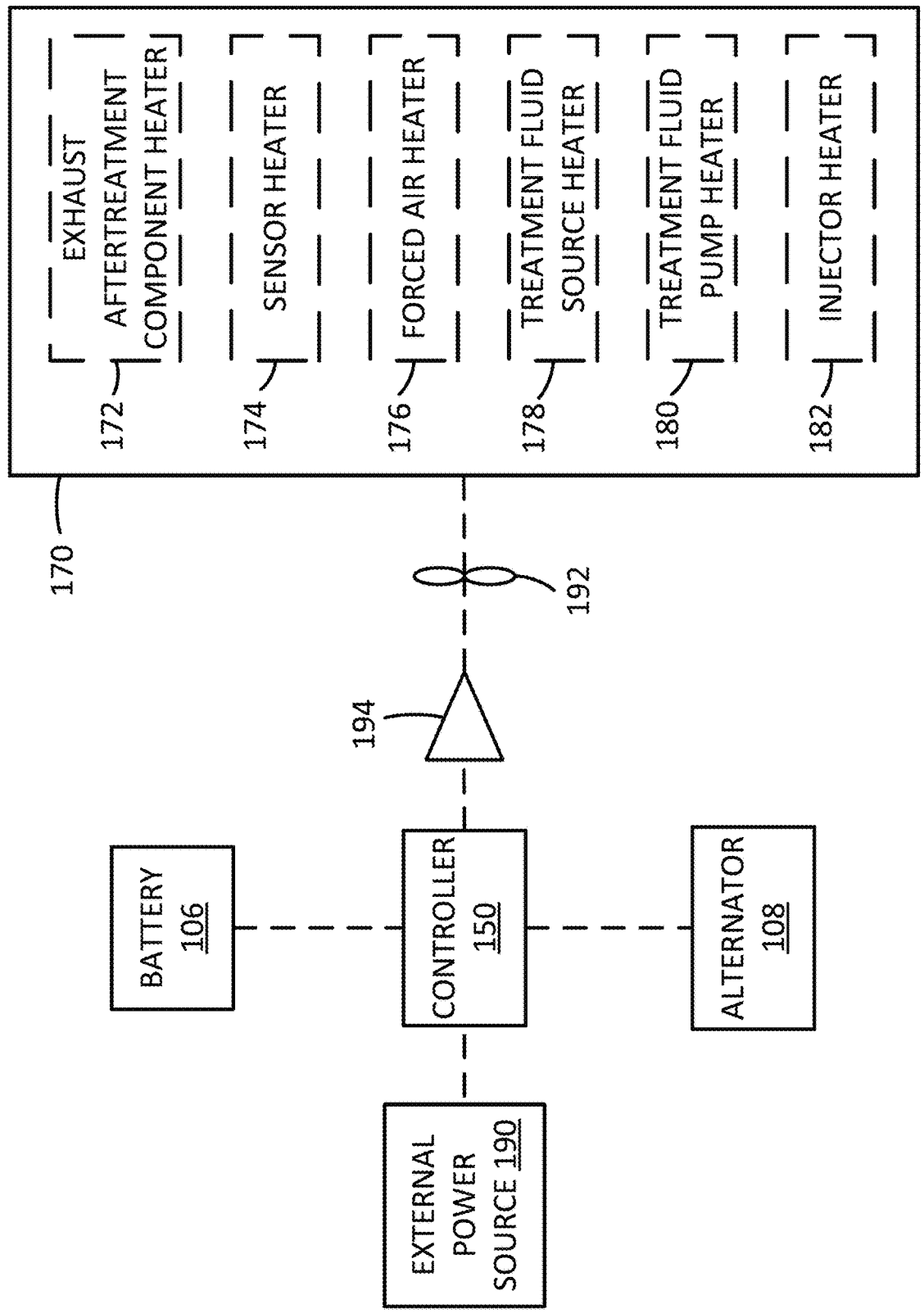
FIG. 3 is a block schematic diagram of the heater assembly of FIG. 1.
Figure 4:
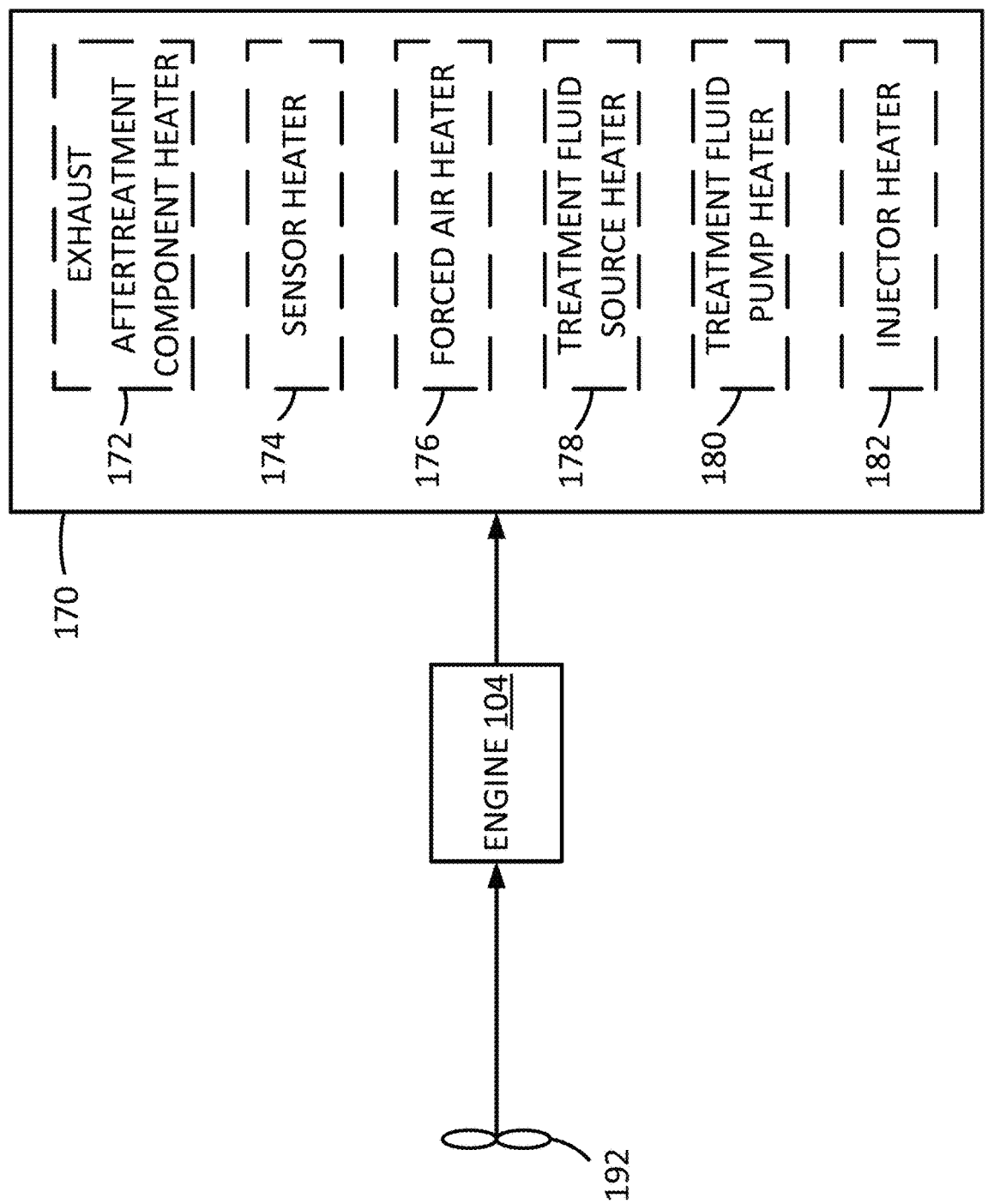
FIG. 4 is a block schematic diagram of an example configuration of a fan, an engine, and the heater assembly.
Figure 5:
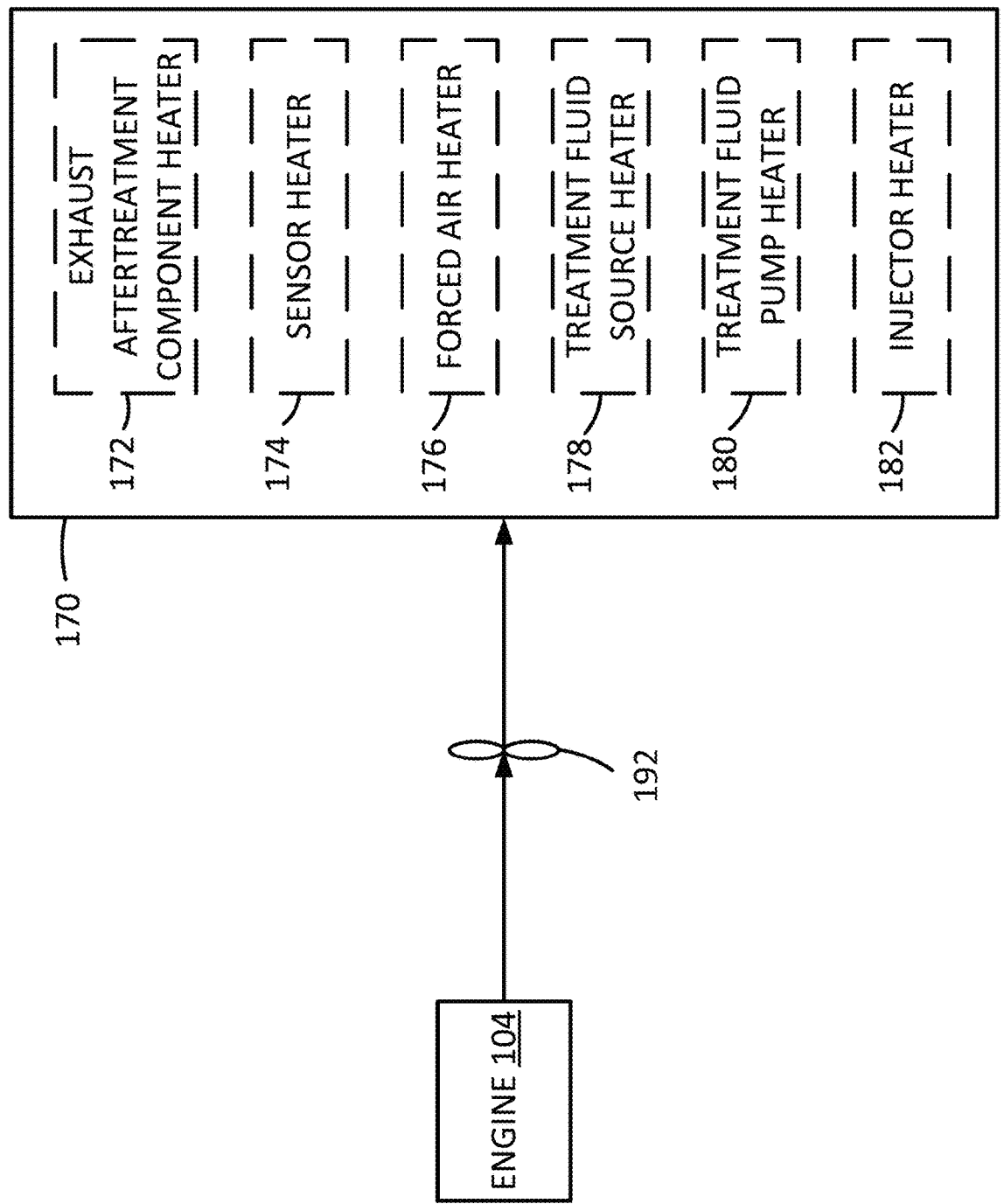
FIG. 5 is a block schematic diagram of another example configuration of the fan, the engine, and the heater assembly.

As illustrated in FIGS. 3-5, the heater assembly 170 includes a sensor heater 174. The sensor heater 174 may be proximate to the sensor 162 (e.g., less than 1, 3, 5, etc. times a diameter of the sensor 162 away from the sensor 162, less than 1, 3, 5, etc. times a diameter of the sensor heater 174 away from the sensor 162, less than 1, 3, 5, etc. times a diameter of the exhaust conduit system 112 away from the sensor 162, etc.). For example, the sensor heater 174 may be disposed upstream, within, around, or downstream of the sensor 162. The sensor heater 174 is configured to heat the sensor 162.

The heater assembly 170 includes a forced air heater 176. The forced air heater 176 is configured to transfer at least a portion of heat generated by the exhaust aftertreatment component heater 172 to the exhaust aftertreatment component 144 via air by transferring the air from the exhaust aftertreatment component heater 172 to the exhaust aftertreatment component 144 (i.e., the air moved to the exhaust aftertreatment component 144 is heated by the exhaust aftertreatment component heater 172, such that the exhaust aftertreatment component 144 receives heated air, etc.). The forced air heater 176 may be proximate to the exhaust aftertreatment component heater 172 (e.g., less than 1, 3, 5, etc. times a diameter of the exhaust aftertreatment component heater 172 away from the exhaust aftertreatment component heater 172, less than 1, 3, 5, etc. times a diameter of the forced air heater 176 away from the exhaust aftertreatment component heater 172, less than 1, 3, 5, etc. times a diameter of the exhaust conduit system 112 away from the exhaust aftertreatment component heater 172, etc.) and/or the exhaust aftertreatment component 144 (e.g., less than 1, 3, 5, etc. times a diameter of the exhaust aftertreatment component 144 away from the exhaust aftertreatment component 144, less than 1, 3, 5, etc. times a diameter of the forced air heater 176 away from the exhaust aftertreatment component 144, less than 1, 3, 5, etc. times a diameter of the exhaust conduit system 112 away from the exhaust aftertreatment component 144, etc.). For example, the forced air heater 176 may be disposed upstream, within, around, or downstream of the exhaust aftertreatment component heater 172 and/or the exhaust aftertreatment component 144.

The heater assembly 170 includes a treatment fluid source heater 178. The treatment fluid source heater 178 may be proximate to the treatment fluid source 126 (e.g., less than 1, 3, 5, etc. times a diameter of the treatment fluid source 126 away from the treatment fluid source 126, less than 1, 3, 5, etc. times a diameter of the treatment fluid source heater 178 away from the treatment fluid source 126, less than 1, 3, 5, etc. times a diameter of the exhaust conduit system 112 away from the treatment fluid source 126, etc.). For example, the treatment fluid source heater 178 may be disposed upstream, within, around, or downstream of the treatment fluid source 126. The treatment fluid source heater 178 is configured to heat the treatment fluid source 126.

The heater assembly 170 includes a treatment fluid pump heater 180. The treatment fluid pump heater 180 may be proximate to the treatment fluid pump 128 (e.g., less than 1, 3, 5, etc. times a diameter of the treatment fluid pump 128 away from the treatment fluid pump 128, less than 1, 3, 5, etc. times a diameter of the treatment fluid pump heater 180 away from the treatment fluid pump 128, less than 1, 3, 5, etc. times a diameter of the exhaust conduit system 112 away from the treatment fluid pump 128, etc.). For example, the treatment fluid pump heater 180 may be disposed upstream, within, around, or downstream of the treatment fluid pump 128. The treatment fluid pump heater 180 is configured to heat the treatment fluid pump 128.

The heater assembly 170 includes an injector heater 182. The injector heater 182 may be proximate to the injector 132 (e.g., less than 1, 3, 5, etc. times a diameter of the injector 132 away from the injector 132, less than 1, 3, 5, etc. times a diameter of the injector heater 182 away from the injector 132, less than 1, 3, 5, etc. times a diameter of the exhaust conduit system 112 away from the injector 132, etc.). For example, the injector heater 182 may be disposed upstream, within, around, or downstream of the injector 132. The injector heater 182 is configured to heat the injector 132.

In some embodiments, the exhaust aftertreatment system 110 includes multiple exhaust aftertreatment components 144 and multiple sensors 162, where each of the sensors 162 is associated with one of the exhaust aftertreatment components 144. For example, the controller 150 may determine an estimated temperature of each of the exhaust aftertreatment components 144 based on temperature signals received from the associated sensors 162.

As illustrated in FIGS. 1 and 3, the vehicle power system 100 further includes an external power source 190. The external power source 190 is electrically or communicatively coupled to the controller 150. The external power source 190 is separate from the vehicle 102. For example, the external power source 190 is not mounted to the vehicle 102. Any physical connection between the external power source 190 and the vehicle 102 may be made solely for an electrical or communicational connection, such that the external power source 190 is still considered separate from the vehicle 102. The external power source 190 may include a fixed electrical receptacle (i.e., powered by an electrical grid, etc.) or an electrical generator.

As illustrated in FIGS. 3-5, the vehicle power system 100 includes a fan 192 (e.g., a blower, etc.). The fan is configured to blow air. In some embodiments, as illustrated in FIG. 4, the fan 192 is disposed upstream of the engine 104. In other embodiments, as illustrated in FIG. 5, the fan 192 is disposed downstream of the engine 104. In some embodiments, a distance between the fan 192 and the engine 104 is at least 0.5 meters. In other embodiments, the distance between the fan 192 and the engine 104 is less than 0.5 meters. In some embodiments, the fan 192 is disposed upstream of the exhaust aftertreatment component 144. In other embodiments, the fan 192 is disposed downstream of the exhaust aftertreatment component 144. In some embodiments, the fan 192 is disposed upstream of the heater assembly 170 or at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.). In other embodiments, the fan 192 is disposed downstream of the heater assembly 170 or at least one of the heaters of the heater assembly 170.

As illustrated in FIG. 3, the vehicle power system 100 includes an inverter 194. The inverter 194 is electrically or communicatively coupled to the controller 150. The inverter 194 is configured to receive Direct Current (DC) and provide Alternating Current (AC). For example, the inverter 194 may receive electrical power in DC form from the controller 150, which the controller 150 received from the battery 106, the alternator 108, and/or the external power source 190, transform the electrical power from the DC form to AC form, and provide the electrical power in the AC form to at least one of the fan 192, the heater assembly 170, or at least one heater of the heater assembly 170 (e.g., the exhaust aftertreatment component heater 172, the sensor heater 174, the forced air heater 176, the treatment fluid source heater 178, the treatment fluid pump heater 180, the injector heater 182, etc.).

III. OVERVIEW OF EXAMPLE VEHICLE POWER SYSTEM OPERATIONAL PROCESS

Figure 6:
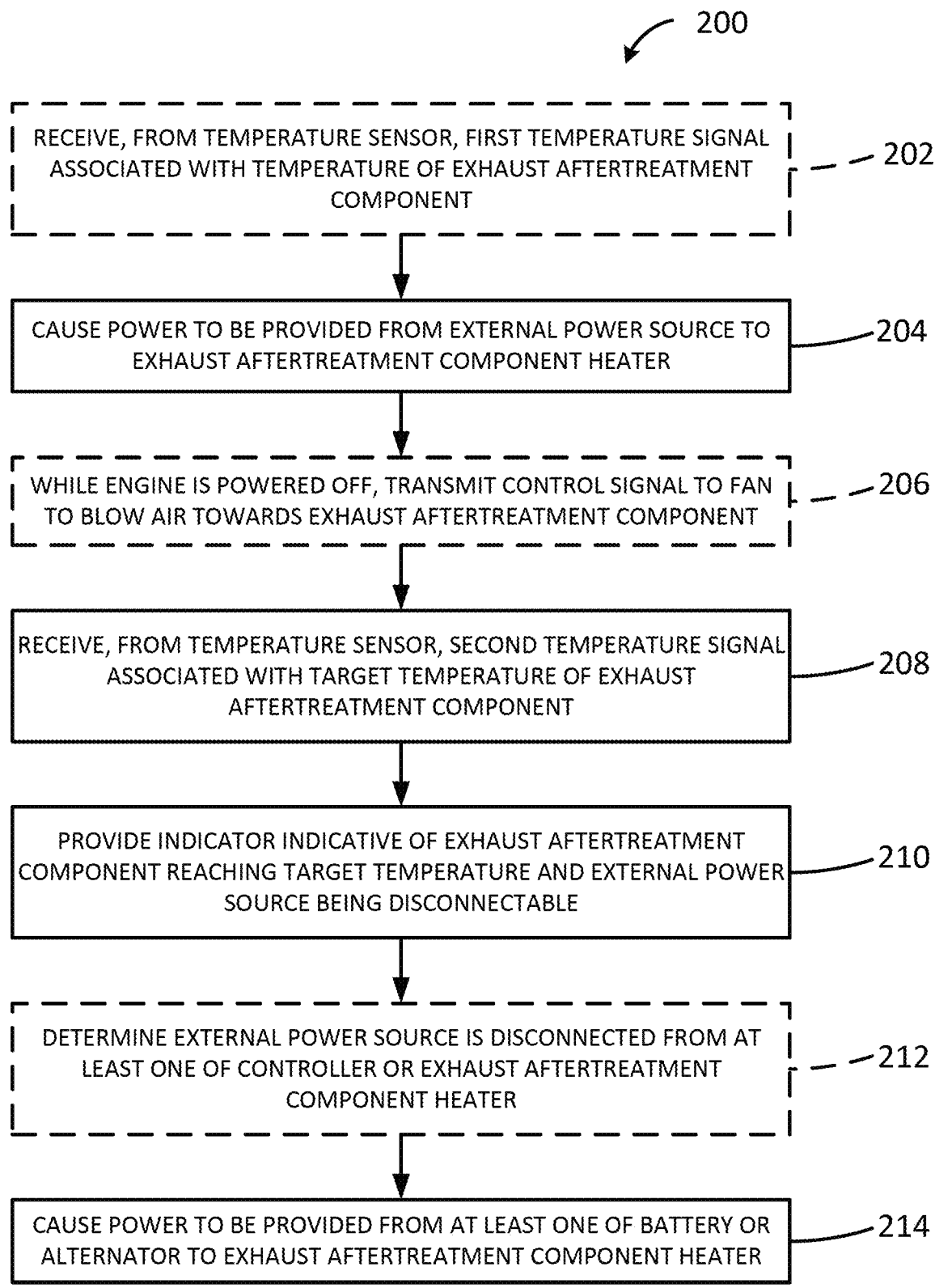
FIG. 6 is a block diagram of operating the vehicle power system of FIG. 1.

FIG. 6 illustrates an example method 200 (e.g., a process, a procedure, etc.) for operating the vehicle power system 100. The method 200 may be performed by the controller 150 or the components of the controller 150 (e.g., the processing circuit 152, the processor 154, etc.).

As shown in FIG. 6, at 202, the controller 150 receives, from a temperature sensor (e.g., the sensor 162), a first temperature signal associated with a temperature of the exhaust aftertreatment component 144. The controller 150 is configured to determine the temperature of the exhaust aftertreatment component 144 based on the first temperature signal. In some embodiments, the controller 150 determines the temperature of the exhaust aftertreatment component 144 based on at least one of a voltage of the first temperature signal from the sensor 162, a current of the first temperature signal from the sensor 162, or an impedance of the first temperature signal from the sensor 162.

The controller 150 may compare the temperature of the exhaust aftertreatment component 144 to a target temperature of the exhaust aftertreatment component 144. The target temperature of the exhaust aftertreatment component 144 may be associated with a temperature of the exhaust aftertreatment component 144 in which the exhaust aftertreatment component 144 reaches a threshold $NO_X$ conversion efficiency. The threshold $NO_X$ conversion efficiency may be 50%, 70%, 95%, or the like.

At 204, the controller 150, in response to determining that the temperature of the exhaust aftertreatment component 144 is less than the target temperature of the exhaust aftertreatment component 144, causes power to be provided from the external power source 190 to the exhaust aftertreatment component heater 172. As utilized herein, "in response to" conveys that events happen sequentially without regard to an amount of time elapsed between the events or any immaterial processes (e.g., processing unrelated to the events, etc.) that occur between the events. For example, a first event occurs in response to a second event, where the first event happens within a time period (e.g., 10 seconds, 5 minutes, etc.) of the second event or immediately after the second event. Additionally, or alternately, at 204, the controller 150 may cause power to be provided from the external power source 190 to the heater assembly 170 or any other heaters of the heater assembly 170 (e.g., the sensor heater 174, the forced air heater 176, the treatment fluid source heater 178, the treatment fluid pump heater 180, the injector heater 182, etc.).

At 206, the controller 150, while the engine 104 is powered off, transmits a control signal to the fan 192 to blow air towards the exhaust aftertreatment component 144. A flow path of the air can cross the exhaust aftertreatment component heater 172 and the exhaust aftertreatment component 144.

The controller 150 determines, based on at least one of the temperature of the exhaust aftertreatment component 144 or the target temperature, a speed of the fan 192 and cause a fan power associated with the speed to be provided from at least one of the alternator 108 (e.g., after the engine 104 is powered on, etc.), the battery 106, or the external power source 190 to the fan 192 while providing the power from the external power source 190 to the heater. In some embodiments, the controller 150 determines the speed of the fan 192 based on the temperature and the target temperature.

The engine 104 includes a cylinder (e.g., a combustion chamber, etc.). The engine 104 further includes an intake valve associated with the cylinder. The intake valve is configured to selectively permit air or air and fuel mixture into the cylinder. For example, the intake valve is operable between multiple positions, e.g., a first position, a second position, and a third position. At the first position (i.e., an open position), the intake valve allows a maximum amount of the air or the air and fuel mixture to flow into the cylinder. At the second position (i.e., a closed position), the intake valve prevents, or substantially prevents, the air or the air and fuel mixture from flowing into the cylinder. At the third position (i.e., a partially open position, a partially closed position, etc.), the intake valve allows a portion of the air or the air and fuel mixture to flow into the cylinder. The engine 104 further includes an exhaust valve associated with the cylinder. The exhaust valve is configured to selectively release exhaust from the cylinder. For example, the exhaust valve is operable between multiple positions, e.g., a first position, a second position, and a third position. At the first position (i.e., an open position), the exhaust valve allows a maximum amount of the exhaust to be released from the cylinder. At the second position (i.e., a closed position), the exhaust valve prevents, or substantially prevents, the exhaust from being released from the cylinder. At the third position (i.e., a partially open position, a partially closed position, etc.), the exhaust valve allows a portion of the exhaust to be released from the cylinder. In embodiments in which the fan 192 is upstream of the engine 104, the controller 150 may cause the intake valve and the exhaust valve to be set to an open position while the fan 192 is blowing the air such that the air blown by the fan passes through the cylinder to downstream of the engine 104.

At 208, the controller 150 receives, from the temperature sensor (e.g., the sensor 162), a second temperature signal associated with the target temperature of the exhaust aftertreatment component 144. The controller 150 may be configured to confirm that the second temperature signal is associated with the target temperature by determining a temperature (i.e., the target temperature) based on the second temperature signal.

At 210, the controller 150 provides an indicator indicative of the exhaust aftertreatment component 144 reaching the target temperature and the external power source 190 being disconnectable from at least one of the controller 150 or the exhaust aftertreatment component heater 172. The indicator may be presented visually via a light or a display and/or audibly via a speaker. The light, the display, and/or the speaker may be coupled to the vehicle 102. In some embodiments, the external power source 190 may be disconnected from the at least one of the controller 150 or the exhaust aftertreatment component heater 172 by being physically disconnected from the vehicle 102, the controller 150, or the exhaust aftertreatment component heater 172. In other embodiments, the external power source 190 may be disconnected from the at least one of the controller 150 or the exhaust aftertreatment component heater 172 by the controller 150 operating a switch (e.g., a breaker, etc.) that physically disconnects an electrical connection between the external power source 190 and the at least one of the controller 150 or the exhaust aftertreatment component heater 172.

At 212, the controller 150, in response to providing the indicator (e.g., at 210) (i.e., after providing the indicator, etc.), determines that the external power source 190 is disconnected from the at least one of the controller 150 or the exhaust aftertreatment component heater 172. The controller 150 may determine that the external power source 190 is disconnected from the at least one of the controller 150 or the exhaust aftertreatment component heater 172 based on a lack of electrical power from the external power source 190. Additionally, or alternately, the controller 150 may determine that the external power source 190 is disconnected from the at least one of the controller 150 or the exhaust aftertreatment component heater 172 based on operating the switch that physically disconnects the electrical connection between the external power source 190 and the at least one of the controller 150 or the exhaust aftertreatment component heater 172.

At 214, the controller 150, in response to determining that the external power source 190 is disconnected and an operation of the exhaust aftertreatment component heater 172 should be maintained, causes the power (e.g., electrical power, etc.) to be provided from at least one of the battery 106 or the alternator 108 to the exhaust aftertreatment component heater 172. The controller 150 may determine whether the operation of the exhaust aftertreatment component heater 172 should be maintained based on receiving an additional temperature signal associated with a temperature less than the target temperature of the exhaust aftertreatment component 144.

The controller 150 may, in response to receiving a key-on signal associated with a key-on event of the vehicle 102, causes the power to be provided from the alternator 108 to the heater assembly 170 or at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.) in addition to providing the power from the external power source 190 to the heater assembly 170 or the at least one of the heaters of the heater assembly 170. The key-on event may be a key associated with the vehicle 102 turning an ignition switch of the vehicle 102. In some embodiments, the controller 150 receives the key-on signal from the ignition switch in response to the ignition switch turning. In other embodiments, the controller 150 receiving the key-on signal includes the controller 150 determining that the ignition switch has been turned by the key. The key-on event may be the engine 104 powering on, such that the controller 150 receives the key-on signal in response to the engine 104 being powered on.

In some embodiments, after receiving the key-on signal, during a first time period, an amount of the power provided from the external power source 190 to the heater assembly 170 or the at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.) is greater than an amount of the power provided from the alternator 108 to the heater assembly 170 or the at least one of the heaters of the heater assembly 170. During a second time period after the first time period, the amount of the power provided from the alternator 108 to the heater assembly 170 or the at least one of the heaters of the heater assembly 170 is greater than the amount of the power provided from the external power source 190 to the heater assembly 170 or the at least one of the heaters of the heater assembly 170. During a third time period after the first time period and before the second time period, the amount of the power provided from the external power source 190 to the heater assembly 170 or the at least one of the heaters of the heater assembly 170 is equal to 95% to 105% of the amount of the power provided from the alternator 108 to the heater assembly 170 or the at least one of the heaters of the heater assembly 170.

The controller 150 may, in response to receiving the key-on signal, cause the power to be provided from the battery 106 to the heater assembly 170 or the at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.) in addition to providing the power from the alternator 108 and the external power source 190 to the heater assembly 170 or the at least one of the heaters of the heater assembly 170.

The controller 150 may, in response to receiving the key-on signal, delay providing the power from the alternator 108 to the heater assembly 170 or the at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.) for a predetermined time period equal to or greater than 5 seconds. In some embodiments, the predetermined time period is between 5 seconds and 30 seconds, inclusive. In other embodiments, the predetermined time period is less than 5 seconds or greater than 30 seconds.

The controller 150 may, prior to receiving the key-on signal, cause the power to be provided from the battery 106 to the heater assembly 170 or the at least one of the heaters of the heater assembly 170 (e.g., the exhaust aftertreatment component heater 172, the sensor heater 174, the forced air heater 176, the treatment fluid source heater 178, the treatment fluid pump heater 180, the injector heater 182, etc.) in addition to providing the power from the external power source 190 to the heater assembly 170 or the at least one of the heaters of the heater assembly 170.

The controller 150 may determine a state of charge of the battery 106 and, in response to determining that the state of charge is less than a target threshold, cause battery power to be provided from at least one of the alternator 108 or the external power source 190 to the battery 106. The target threshold may be equal to, or approximately equal to (e.g., +/−10%, +/−5%, +/−1%, etc. of the target threshold), maximum charge capacity of the battery 106 (e.g., 100%, etc.).

The heater assembly 170 may include a first heater that is disposed at a first location within the exhaust aftertreatment system 110. For example, the first heater may include the exhaust aftertreatment component heater 172 and the first location may include upstream, within, around, or downstream of the exhaust aftertreatment component 144. The heater assembly 170 may further include a second heater that is disposed at a second location within the exhaust aftertreatment system 110 different from the first location. For example, the second heater may include the sensor heater 174 and the second location may include upstream, within, around, or downstream of the sensor 162. The controller 150 may be configured to cause the power to be provided from at least one of the alternator 108, the battery 106, or the external power source 190 to the first heater and the second heater.

The exhaust aftertreatment system 110 may include a first exhaust aftertreatment component (e.g., a first exhaust aftertreatment component of the exhaust aftertreatment components 144) that is disposed proximate to the first location of the first heater. The exhaust aftertreatment system 110 may include a second exhaust aftertreatment component (e.g., a second exhaust aftertreatment component of the exhaust aftertreatment components 144) that is disposed proximate to the second location of the second heater. The exhaust aftertreatment system 110 may further include a first temperature sensor (e.g., a first sensor of the sensors 162) proximate the first exhaust aftertreatment component and a second temperature sensor (e.g., a second sensor of the sensors 162) proximate the second exhaust aftertreatment component.

The controller 150 may receive, from the first temperature sensor, a first temperature signal associated with a first temperature of the first exhaust aftertreatment component and, in response to providing power from the external power source 190 to the first heater, receive, from the first temperature sensor, a second temperature signal associated with a first target temperature of the first exhaust aftertreatment component. The first target temperature is greater than the first temperature. The controller 150 may receive, from the second temperature sensor, a third temperature signal associated with a second temperature of the second exhaust aftertreatment component and, in response to providing the power from the at least one of the alternator 108, the battery 106, or the external power source 190 to the second heater, receive, from the second temperature sensor, a fourth temperature signal associated with a second target temperature of the second exhaust aftertreatment component. The second target temperature is greater than the second temperature. The indicator may be indicative of the first exhaust aftertreatment component reaching the first target temperature and the second exhaust aftertreatment component reaching the second target temperature.

It is to be appreciated that the first heater and the second heater are not limited to the examples above and may include any of the exhaust aftertreatment component heater 172, the sensor heater 174, the forced air heater 176, the treatment fluid source heater 178, the treatment fluid pump heater 180, or the injector heater 182. Similarly, it is to be appreciated that the first location and the second location are not limited to the examples above and may include any of the locations associated with the first heater and the second heater, respectively.

It is to be appreciated that the operations of the method 200 (i.e., 202, 204, 206, 208, 210, 212, 214, etc.) can be combined, omitted, and/or reordered relative to each other. For example, the operations 202, 206, and 212 of the method 200 can be omitted. Other operations of the method 200 (e.g., 204, 208, 210, 214, etc.) can also, or alternatively, be omitted.

IV. CONFIGURATION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, treatment fluid, an air-treatment fluid mixture, exhaust, hydrocarbon fluid, an air-hydrocarbon fluid mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A controller for a vehicle power system comprising (i) a vehicle including a battery, an alternator powered by an engine, and an exhaust aftertreatment system including a first exhaust aftertreatment component, a first temperature sensor, and a first heater, and (ii) an external power source separate from the vehicle, the controller configured to:
receive a first temperature signal from the first temperature sensor, the first temperature signal indicative of a current temperature of the first exhaust aftertreatment component;
direct a first power amount to the first heater from the external power source when the current temperature of the first exhaust aftertreatment component is less than a first target temperature;
direct a second power amount to the first heater from the alternator in addition to the first power amount when a key-on signal associated with a key-on event of the vehicle is received; and
provide an indication when the current temperature of the first exhaust aftertreatment component reaches the first target temperature, the indication indicating that the external power source is disconnectable from the first heater.

2. The controller of claim 1, wherein the controller is further configured to:
direct power to the first heater from at least one of the battery or the alternator when (i) the external power source is disconnected from the first heater, and (ii) a determination is made that an operation of the first heater should be maintained.

3. The controller of claim 1, wherein:
during a first time period after the key-on signal is received, the first power amount is greater than the second power amount; and
during a second time period after the first time period, the second power amount is greater than the first power amount.

4. The controller of claim 3, wherein, during a third time period after the first time period and before the second time period, the first power amount is at least 95% and at most 105% of the second power amount.

5. The controller of claim 1, wherein the controller is further configured to direct a third power amount to the first heater from the battery in addition to the first power amount and the second power amount when the key-on signal is received.

6. The controller of claim 1, wherein the controller is further configured to direct a third power amount to the first heater from the battery in addition to the first power amount prior to receiving the key-on signal.

7. The controller of claim 1, wherein the key-on signal is indicative of the engine being powered on.

8. The controller of claim 1, wherein the controller is further configured to delay the directing of the second power amount for a predetermined time period of at least 5 seconds when the key-on signal is received.

9. The controller of claim 8, wherein the predetermined time period is at most 30 seconds.

10. The controller of claim 1, wherein the controller is further configured to:
determine a state of charge of the battery; and
direct power to the battery from at least one of the alternator or the external power source when the state of charge is less than a target threshold value.

11. An exhaust aftertreatment system comprising:
the controller of claim 1;
the first heater disposed at a first location; and
a second heater disposed at a second location different from the first location, the second heater configured to receive a fourth power amount from at least one of the alternator, the battery, or the external power source.

12. The exhaust aftertreatment system of claim 11, further comprising:
the first exhaust aftertreatment component associated with the first heater;
the first temperature sensor associated with the first exhaust aftertreatment component;
a second exhaust aftertreatment component associated with the second heater; and
a second temperature sensor associated with the second exhaust aftertreatment component;
wherein the controller is further configured to:
receive a second temperature signal from the second temperature sensor, the second temperature signal indicative of a current temperature of the second exhaust aftertreatment component, direct the fourth power amount to the second heater when the current temperature of the second exhaust aftertreatment component is less than a second target temperature, and
provide the indication when (i) the current temperature of the first exhaust aftertreatment component has reached the first target temperature, and (ii) the current temperature of the second exhaust aftertreatment component has reached the second target temperature.

13. The controller of claim 1, wherein the controller is further configured to:
determine a target speed of a fan of the vehicle based on at least one of the current temperature of the first exhaust aftertreatment component or the first target temperature; and
direct power to the fan from at least one of the alternator, the battery, or the external power source so as to achieve the target speed when the first power amount is being directed to the first heater.

14. The controller of claim 13, wherein the determining of the target speed of the fan is based on the current temperature of the first exhaust aftertreatment component and the first target temperature.

15. A vehicle power system of a vehicle, the vehicle power system comprising:
- an engine;
- an alternator powered by the engine;
- an exhaust aftertreatment system configured to treat exhaust received from the engine, the exhaust aftertreatment system including:
  - an exhaust aftertreatment component,
  - a temperature sensor, and
  - a heater associated with the exhaust aftertreatment component;
- a fan disposed upstream of the exhaust aftertreatment component, the fan configured to blow air towards the exhaust aftertreatment component such that a flow path of the air crosses the heater and the exhaust aftertreatment component; and
- a controller configured to:
  - receive a temperature signal from the temperature sensor, the temperature signal indicative of a current temperature of the exhaust aftertreatment component,
  - direct a first power amount to the heater from an external power source when the current temperature of the exhaust aftertreatment component is less than a target temperature, the external power source being separate from the vehicle,
  - control the fan so as to blow air towards the exhaust aftertreatment component while the engine is powered off, and
  - direct a second power amount to the heater from the alternator in addition to the first power amount when a key-on signal associated with a key-on event of the vehicle is received.

16. The vehicle power system of claim 15, wherein:
the fan is disposed at least 0.5 meters downstream of the engine.

17. The vehicle power system of claim 15, wherein the fan is disposed upstream of the engine.

18. The vehicle power system of claim 17, wherein:
the engine comprises a cylinder including an intake valve and an exhaust valve; and
the controller is further configured to maintain the intake valve and the exhaust valve in an open position while the fan is blowing the air.

19. A method for controlling a vehicle power system comprising (i) a vehicle including an engine, an alternator powered by the engine, and an exhaust aftertreatment system including an exhaust aftertreatment component, a temperature sensor, and a heater, and (ii) an external power source separate from the vehicle, the method comprising:
- directing a first power amount to the heater from the external power source;
- activating a fan configured to blow air towards the exhaust aftertreatment component such that a flow path of the air crosses the heater and the exhaust aftertreatment component while the engine is powered off;
- directing a second power amount to to the heater from the alternator in addition to the first power amount when a key-on signal associated with a key-on event of the vehicle is received; and
- providing an indication when a current temperature of the exhaust aftertreatment component reaches a target temperature, the indication indicating that the external power source is disconnectable from the heater.

* * * * *